Aug. 18, 1925.
V. E. PROVOST
CHAIN CONNECTION
Filed Feb. 14, 1924
1,550,454
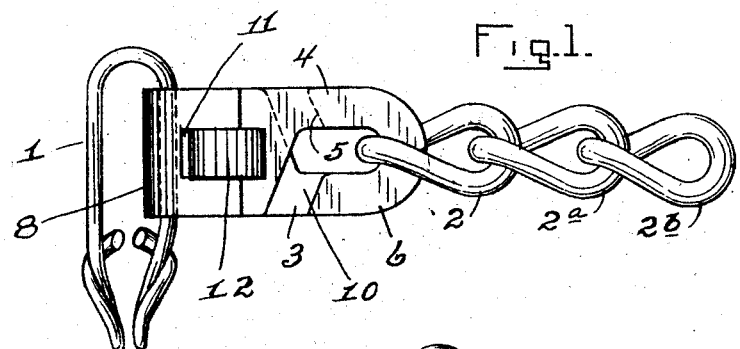
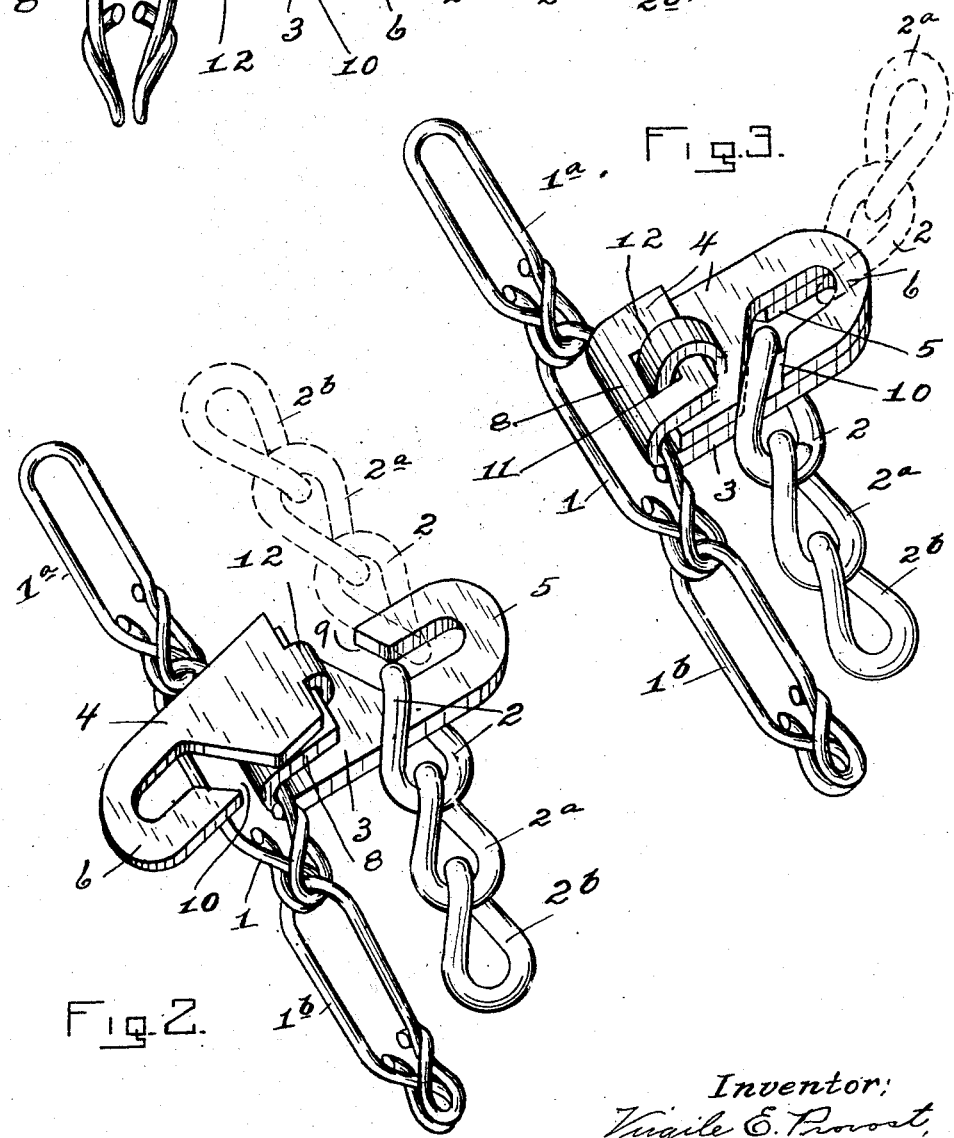
Inventor:
Virgile E. Provost,
By Frank C. Curtis
Attorney Patented Aug. 18, 1925.

1,550,454

UNITED STATES PATENT OFFICE.

VIRGILE E. PROVOST, OF COHOES, NEW YORK.

CHAIN CONNECTION.

Application filed February 14, 1924. Serial No. 692,790.

*To all whom it may concern:*

Be it known that I, VIRGILE E. PROVOST, a citizen of the United States, residing at Cohoes, in the county of Albany and State of New York, have invented new and useful Improvements in Chain Connections, of which the following is a specification.

Reference may be had to the accompanying drawings, and the reference characters marked thereon, which form a part of this specification. Similar characters refer to similar parts in the several figures therein.

This invention relates to chain connections and is particularly adapted for connecting cross chains with longitudinal chains of non-skid chain attachments for automobile tires.

The principal object of the invention is to connect a cross chain with a longitudinal or circumferential chain without the use of tools.

Other objects will appear in connection with the following description.

Fig. 1 of the drawings is a plan view showing one link of a longitudinal chain and the connection between the longitudinal chain and a cross chain.

Fig. 2 is a view in perspective of the same showing additional links of the longitudinal chain and illustrating the first step in connecting a cross chain with, or the last step in disconnecting it from, the longitudinal chain in accordance with my invention.

Fig. 3 is a similar view illustrating the first step in disconnecting a cross chain from, or the last step in connecting it with, the longitudinal chain in accordance with my invention.

Referring to the drawings wherein the invention is shown in preferred form, 1, 1ª and 1ᵇ, are links of a longitudinal or circumferential chain such as is commonly applied to automobile tires to prevent skidding. 2 is the end link of a cross chain, other links of the cross chain being designated as 2ª and 2ᵇ.

It will be understood that in the preferred use of the invention, two side chains are employed connected at desired intervals by the cross chains as is well understood in the art.

The present invention relates to the manner of connecting a cross chain with a longitudinal or circumferential chain.

As a means for connecting the end link, 2, of the cross chain with a link, 1, of the longitudinal chain, I employ a pair of links, 3 and 4, terminating at one end respectively in hooks, 5 and 6, adapted to coincidently engage the end link, 2, of the cross chain, as shown in Figs. 1 and 3.

These links, 3 and 4, are preferably made of sheet-metal and one is flatly superimposed upon the other, the bodies of the two links being pivotally connected together on an axis parallel with the longitudinal chain.

As shown, the link, 3, has its body portion bent to form a loop, 8, embracing a side member of the link, 1, of the longitudinal chain.

The end of the bent-over portion of the link, 3, which forms the loop, 8, is provided with an opening, 11, adapted to be pivotally engaged by a loop or eye, 12, formed upon the body portion of the link, 4, whereby the two links, 3 and 4, are pivotally connected together to swing one toward and from the other in a path crosswise of the longitudinal chain.

The hook, 5, is formed with an opening, 9, on its right-hand side, and the hook, 6, is formed with a similar opening, 10, on its left-hand side as shown in the drawings.

Each of the links, 3 and 4 thus closes the opening of the hook on the other link when the hooks of the two links are coincident as shown in Figs. 1 and 3.

The operation of this form of the device is as follows:

When it is desired to connect a cross chain with the longitudinal chain, the link, 4, is swung away from the link, 3, crosswise of the longitudinal chain until the opening, 9, in the hook, 5, of the link, 3, is free for the insertion of the end link, 2, of the cross chain which is then inserted through said opening into the hook, 5, and slid along said hook from the dotted position to the position shown in solid lines in Fig. 2.

The link, 4, is then swung back to normal position in which its hook portion, 6, coincides with the hook portion, 5, of the link, 3, except that the openings in the two hooks face in opposite direction as shown in Fig. 3.

In this position the end link, 2, of the cross chain is passed through the opening, 10, into the hook, 6, thus being coincidently engaged by both hooks, 5 and 6, as shown in Fig. 1, and indicated by dotted lines in Fig. 3.

In disconnecting a cross chain the above described operation is reversed; the end link, 2, of the cross chain is brought into the opening, 10, of the hook, 6, of the link, 4, as shown in Fig. 3; the link, 4, is then swung away from the link, 3, to the position shown in Fig. 2, freeing its hook, 6, from said end link, 2, as shown in Fig. 2; the end link, 2, is then slid along the hook, 5, of the link, 3, from the position shown by solid lines to that indicated by dotted lines in Fig. 2, and is then drawn out through the opening, 9, in the hook, 5.

The connection between the link, 3, and the link, 1, formed by the loop, 8, is preferably a pivotal connection.

While I have shown my invention in connection with a special structure and as operating in a definite manner, it should be understood that I do not limit my invention thereto, except in so far as it is limited by the scope of the claims annexed hereto.

What I claim as new and desire to secure by Letters Patent is—

1. In a chain-connection and in combination, two members of sheet-metal having hooks flatly superimposable one upon the other opening in opposite directions and being coincidently engageable with the same link of a cross chain, said members being connected together by interengaging integral hinge members upon an axis extending transversely of the cross chain, one of said members having means whereby it is adapted to be connected with a support.

2. In a chain-connection and in combination, two members of sheet-metal having hooks flatly superimposable one upon the other opening in opposite directions and being coincidently engageable with the same link of a cross chain, one of said links having an end portion bent over to form a loop adapted to embrace a side member of a link of a longitudinal chain or the like, and being provided with an opening in its bent-over portion, the other of said links having on its inner end a hook with an integral member in hinged engagement with said opening.

In testimony whereof, I have hereunto set my hand this 6th day of February, 1924.

VIRGILE E. PROVOST.